US012211037B2

(12) United States Patent
Lingappa

(10) Patent No.: US 12,211,037 B2
(45) Date of Patent: Jan. 28, 2025

(54) CRYPTOCURRENCY INFRASTRUCTURE SYSTEM

(71) Applicant: Visa International Service Association, San Francisco, CA (US)

(72) Inventor: Phaneendra Ramaseshu Lingappa, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 18/317,565

(22) Filed: May 15, 2023

(65) Prior Publication Data

US 2023/0281614 A1 Sep. 7, 2023

Related U.S. Application Data

(62) Division of application No. 17/341,264, filed on Jun. 7, 2021, now Pat. No. 11,687,924, which is a division of application No. 14/749,573, filed on Jun. 24, 2015, now Pat. No. 11,055,707.

(60) Provisional application No. 62/016,556, filed on Jun. 24, 2014.

(51) Int. Cl.
*G06Q 20/00* (2012.01)
*G06Q 20/06* (2012.01)
*G06Q 20/38* (2012.01)
*G06Q 20/40* (2012.01)

(52) U.S. Cl.
CPC ....... *G06Q 20/3829* (2013.01); *G06Q 20/065* (2013.01); *G06Q 20/3825* (2013.01); *G06Q 20/401* (2013.01)

(58) Field of Classification Search
CPC ............ G06Q 20/3829; G06Q 20/065; G06Q 20/3825; G06Q 20/401
USPC .......................... 705/16, 21, 59; 380/44, 262
See application file for complete search history.

(56) References Cited

U.S. PATENT DOCUMENTS

| | | |
|---|---|---|
| 5,696,827 A | 12/1997 | Brands |
| 5,983,207 A | 11/1999 | Turk et al. |
| 5,999,625 A | 12/1999 | Bellare et al. |
| 11,055,707 B2 | 7/2021 | Lingappa |
| 2002/0002468 A1 | 1/2002 | Spagna et al. |
| 2004/0117303 A1 | 6/2004 | Gamboa |
| 2006/0020641 A1 | 1/2006 | Walsh et al. |

(Continued)

OTHER PUBLICATIONS

"Could a Centralized Body Create a Cryptocurrency and Keep Mining Details Secret?", Let's Talk Bitcoin.com, Mar. 8, 2015, 2 pages.

(Continued)

*Primary Examiner* — Dante Ravetti
(74) *Attorney, Agent, or Firm* — Kilpatrick Townsend & Stockton LLP

(57) ABSTRACT

Embodiments of the present invention are directed to methods and systems for managing a cryptocurrency payment network comprising one or more issuer nodes and one or more distributor nodes. Issuer nodes may be granted different rights from distributor nodes with respect to the issuance and distribution of digital currency within the cryptocurrency payment network. A management system server computer may generate unique node verification key pairs for each node in the cryptocurrency payment network, where the node verification key pairs may be used to identify and authenticate issuer nodes and distributor nodes.

16 Claims, 7 Drawing Sheets

(56) References Cited

U.S. PATENT DOCUMENTS

| | | |
|---|---|---|
| 2008/0120129 A1 | 5/2008 | Seubert et al. |
| 2010/0306087 A1* | 12/2010 | Wilkes .................. G06Q 40/04 705/37 |
| 2013/0198519 A1 | 8/2013 | Marien |
| 2013/0346302 A1 | 12/2013 | Purves et al. |
| 2014/0164251 A1 | 6/2014 | Loh |
| 2014/0226821 A1 | 8/2014 | Kurdziel et al. |
| 2014/0330721 A1 | 11/2014 | Wang |
| 2015/0170112 A1 | 6/2015 | DeCastro |
| 2015/0332395 A1 | 11/2015 | Walker et al. |
| 2015/0371224 A1 | 12/2015 | Lingappa |
| 2019/0220859 A1 | 7/2019 | Weight et al. |

OTHER PUBLICATIONS

"E-Gold", Available online at: https://en.wikipedia.org/wiki/E-gold, Aug. 2015, 13 pages.
"Notice of Finding that Liberty Reserve S.A. is a Financial Institution of Primary Money Laundering Concern", Department of the Treasury (Liberty Reserve), May 28, 2013, 14 pages.
"Virtual Currencies—Key Definitions and Potential AML/CFT Risks", FATF Report, Jun. 2014, 17 pages.
Restriction Requirement for U.S. Appl. No. 14/749,573, mailed Dec. 20, 2017, 7 pages.
Non-Final Office Action for U.S. Appl. No. 14/749,573, mailed Apr. 3, 2018, 22 pages.
Final Office Action for U.S. Appl. No. 14/749,573, mailed Nov. 20, 2018, 27 pages.
Non-Final Office Action for U.S. Appl. No. 14/749,573, mailed Nov. 5, 2019, 25 Pages.
Final Office Action for U.S. Appl. No. 14/749,573, mailed Apr. 27, 2020, 51 pages.
Non-Final Office Action for U.S. Appl. No. 14/749,573, mailed Aug. 19, 2020, 36 pages.
Final Office Action for U.S. Appl. No. 14/749,573, mailed Jan. 25, 2021, 30 pages.
Notice of Allowability U.S. Appl. No. 14/749,573, dated Mar. 8, 2021, 12 pages.
Corrected Notice of Allowability U.S. Appl. No. 14/749,573, dated Mar. 12, 2021, 12 pages.
Non-Final Office Action for U.S. Appl. No. 17/341,264, mailed Oct. 27, 2022, 21 pages.
Notice of Allowance for U.S. Appl. No. 17/341,264, mailed Feb. 15, 2023, 10 pages.

* cited by examiner

CRYPTOCURRENCY INFRASTRUCTURE SYSTEM

CROSS-REFERENCE TO RELATED APPLICATIONS

This application is a divisional application of U.S. patent application Ser. No. 17/341,264, filed Jun. 7, 2021, which is a divisional application of U.S. patent application Ser. No. 14/749,573, filed Jun. 24, 2015, which claims the benefit of priority from U.S. Provisional Application No. 62/016,556, filed Jun. 24, 2014, titled "CRYPTO-CURRENCY INFRASTRUCTURE SYSTEM," which are incorporated by reference in their entirety for all purposes.

BACKGROUND

The proliferation of mobile devices with Internet capabilities (e.g., mobile phones, wearable devices) has made it increasingly easy for users to conduct electronic commerce and online purchases using merchant websites and mobile applications. This has also led to an increased shift away from paper-based monetary schemes (e.g., the exchange of physical or paper currency) to instead rely upon electronic systems for monetary exchange. Many electronic payment systems have been developed for exchanging money, including the use of electronic wallets and electronic funds transfer (EFT). EFT includes a direct debiting/crediting of a user's bank account at the instance of the user from a remote location.

Another type of electronic system for monetary exchange is commonly referred to as an electronic peer-to-peer payment system or digital currency system. Bitcoin is one example of a digital currency system that utilizes cryptographic techniques, and thus the digital currency is referred to as cryptocurrency. Although there are many such cryptocurrencies, Bitcoin is one of the most well-known and thus will be discussed herein, as many other cryptocurrencies share similar features. Payments made using the Bitcoin system are recorded in a ledger (the "Block Chain", which is maintained in parallel by many different entities in the system) using its own unique monetary unit, which is also called a "bitcoin." The Bitcoin system has no central repository and no single administrator, and thus is viewed as a decentralized virtual currency.

New bitcoins are created as a reward for payment processing work performed by computing devices involved in the Bitcoin system. For example, users may use their personal computing systems to verify and record transactions that are to be entered into the ledger. Users may verify transactions by solving mathematical problems linked to the transaction. This process is referred to as "mining", and both individuals and companies engage in this activity to seek (optional) transaction fees and/or newly created bitcoins. When the user solves the mathematical problem associated with the transaction, that transaction is then appended to the end of the Block Chain. Users typically send and receive bitcoins electronically using wallet software on a personal computer, mobile device, via a web application, or using any other appropriate user computing device.

In addition to mining, bitcoins can also be obtained in exchange for fiat currency (i.e., currency which derives its value from government regulation or law, such as the U.S. Dollar or British Pound), products, and/or services. However, bitcoins themselves are not linked to any fiat currency and derive their value based on a perceived value of the bitcoins.

In practice, each time a node or "miner" (e.g., a user computing device in communication with the network) in the system finds the solution to a mathematical problem, a quantity of "new" bitcoins may be issued to that miner as a reward. Specifically, nodes perform work by repeatedly trying to solve instances of the mathematical problem through trial and error, with each attempt having an equal but very low chance of being a correct solution. When a node successfully solves the mathematical problem (i.e., the network node processes a "block" of transactions), the network node may be rewarded by receiving a programmed amount of bitcoins to compensate the operators of these nodes for their computational work and resources used to secure the bitcoin transactions. In addition, when the mathematical problem is solved, the transaction(s) linked to the mathematical problem are appended to the end of the block chain and distributed to the other nodes in the system.

More specifically, mining is the calculation of a cryptographic hash of a block header, which includes among other things a reference to the previous block (e.g., a previous transaction in the block chain), the current transaction, and a nonce (i.e., a 32-bit field having a random or pseudorandom value). If the determined hash value is found to be less than a current target (which may be inversely proportional to the difficulty), the user has successfully "solved" the problem, a new block may be formed in the block chain with the current transaction, and the miner may be rewarded a quantity of newly generated bitcoins. If the determined hash value is not less than the current target, a new nonce is generated and tried, and a new hash may be calculated. This computation may be done millions of times per second by each miner until the problem is solved.

Once generated or mined, a bitcoin may be stored in a user's bitcoin "wallet" which may be either stored on the user's user computing device by the bitcoin software or hosted on a third-party website or server computer. The wallet may show users their available bitcoin balance, previous transaction history, and the collection of bitcoin addresses they may use to send and receive bitcoins with other users. If an owner of a bitcoin decides to: (i) exchange a quantity of bitcoins for another form of currency, such as for U.S. dollars, and/or (ii) use a quantity of bitcoins as a form of payment for goods or services, the owner of the bitcoin transfers the bitcoin to a payee by digitally signing a hash of the previous transaction (involving the bitcoin) and a public key (also referred to as an "address") of the payee and then adding these to the end of the bitcoin address. With such information viewable in the bitcoin address, the payee (and other nodes) can verify the chain of ownership. For example, when a bitcoin belonging to user A is transferred to user B, user A's ownership over that bitcoin is relinquished by adding user B's public key address to the bitcoin coin and signing the result with the private key that is associated with user A's address. User B now owns the bitcoin and can transfer it further. In this example, user A is prevented from transferring the already spent bitcoin to other users because a ledger of all previous transactions may be collectively maintained by the nodes of the network.

One drawback of systems such as Bitcoin is that because the entire system is based upon trust and is not backed by any government, the value of bitcoins can be highly volatile and driven by speculation.

In addition, fraudsters and criminals are able to rely upon the generally anonymous nature of the Bitcoin system to avoid detection, and theft of bitcoins can be nearly impossible to track down and recover. Thus, while a person who has deposited an amount of an available currency (e.g., U.S.

dollars) at a bank may be required to provide their identification to withdraw their deposited funds and/or transfer funds to another person, bitcoins are anonymous and do not typically require any identification (other than a randomly generated key address) of the party currently owning such bitcoins.

Thus, there is a need for new and enhanced methods of integrating a management system into a cryptocurrency payment network to create a digital currency system that has greater efficiency and more security.

Embodiments of the present invention address these and other problems, individually and collectively.

BRIEF SUMMARY

Embodiments of the present invention relate to systems and methods for the efficient management of a cryptocurrency payment network. Embodiments utilize a management system server computer to determine and designate issuer nodes, which have the right to generate and issue digital currency, and distributor nodes, which have the right to distribute digital currency but not issue digital currency. Transactions performed through the cryptocurrency payment network using the digital currency can be tracked and maintained in a ledger of transactions maintained by the issuer nodes and the distributor nodes.

One embodiment of the invention is directed to a method comprising, determining, by a server computer, that a first financial institution server computer is authorized to generate a digital currency. The method further comprises generating a first digital certificate for the first financial institution server computer. The first digital certificate may include a first key indicating that the first financial institution server computer is authorized to generate the digital currency. The method further comprises determining that a second financial institution server computer is authorized to distribute the digital currency. The method further comprises generating a second digital certificate for the second financial institution server computer. The second digital certificate may include a second key indicating that the second financial institution server computer is authorized to distribute the digital currency to a user computing device. The method further comprises sending the first digital certificate to the first financial institution server computer and the second digital certificate to the second financial institution server computer.

Another embodiment of invention is directed to a server computer comprising: a processor and a computer readable medium coupled to the processor, the computer readable medium comprising code, executable by the processor to implement a method comprising determining that a first financial institution server computer is authorized to generate a digital currency. The method further comprises generating a first digital certificate for the first financial institution server computer. The first digital certificate may include a first key indicating that the first financial institution server computer is authorized to generate the digital currency. The method further comprises determining that a second financial institution server computer is authorized to distribute the digital currency. The method further comprises generating a second digital certificate for the second financial institution server computer. The second digital certificate may include a second key indicating that the second financial institution server computer is authorized to distribute the digital currency to a user computing device. The method further comprises sending the first digital certificate to the first financial institution server computer and the second digital certificate to the second financial institution server computer.

Another embodiment of invention is directed to a method comprising receiving a request message from a financial institution server computer to generate a digital currency. The request message may include an amount of the digital currency to be generated. The request message may be encrypted using a first key of a key pair associated with the financial institution server computer. The method further comprises determining that the financial institution server computer is an issuer node authorized to generate the digital currency. The determination may be made using a second key of the key pair associated with the financial institution server computer. The method further comprises authorizing the financial institution server computer to generate the digital currency by sending a response message to the financial institution server computer.

Another embodiment of invention is directed to a server computer comprising: a processor and a computer readable medium coupled to the processor, the computer readable medium comprising code, executable by the processor to implement a method comprising receiving a request message from a financial institution server computer to generate a digital currency. The request message may include an amount of the digital currency to be generated. The request message may be encrypted using a first key of a key pair associated with the financial institution server computer. The method further comprises determining that the financial institution server computer is an issuer node authorized to generate the digital currency. The determination may be made using a second key of the key pair associated with the financial institution server computer. The method further comprises authorizing the financial institution server computer to generate the digital currency by sending a response message to the financial institution server computer.

Another embodiment of invention is directed to a method comprising receiving a transaction message to transfer an amount of a digital currency from a first payment entity to a second payment entity associated with the server computer. The transaction message may include a first identifier for the first payment entity, a second identifier for the second payment entity, the amount of the digital currency, and a digital signature. The method further comprises validating the transfer of the amount of the digital currency using the digital signature.

Another embodiment of invention is directed to a server computer comprising: a processor and a computer readable medium coupled to the processor, the computer readable medium comprising code, executable by the processor to implement a method comprising receiving a transaction message to transfer an amount of a digital currency from a first payment entity to a second payment entity associated with the server computer. The transaction message may include a first identifier for the first payment entity, a second identifier for the second payment entity, the amount of the digital currency, and a digital signature. The method further comprises validating the transfer of the amount of the digital currency using the digital signature.

These and other embodiments of the invention are described in further detail below with reference to the Drawings and the Detailed Description.

TERMS

Figure 1:
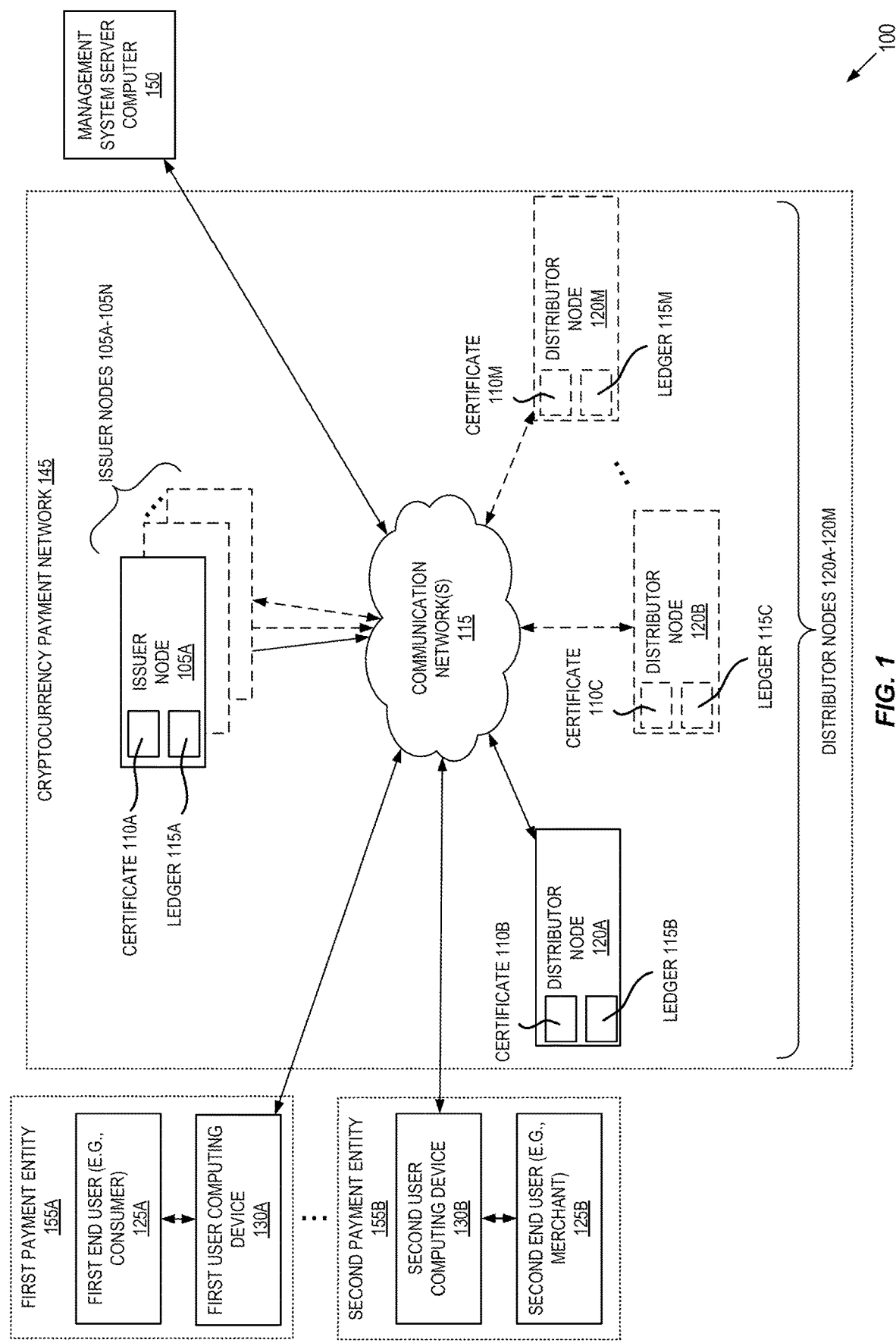
FIG. 1 shows a block diagram of an exemplary system including a cryptocurrency payment network according to an embodiment of the present invention.

Prior to discussing embodiments of the invention, descriptions of some terms may be helpful in providing a better understanding of the invention.

The term "digital currency" may refer to units of value that may be used as a form of payment for transactions, including financial transactions. Digital currency may be currency that is electronically generated by and stored within a user computing device. Digital currency may be purchased using conventional forms of currency (e.g., fiat currency) and generated with a specific value. Typically, the digital currency may not have a physical form of tender but may be accessible through a user computing device (e.g., mobile device) using a software application such as a digital wallet or mobile application.

The term "cryptocurrency payment network" may refer to one or more server computers that function to operate and maintain a cryptocurrency system. The cryptocurrency payment network may function to facilitate the generation/issuance and distribution of digital currency between the one or more server computers within the cryptocurrency payment network. The cryptocurrency payment network may also function to enable the performance of transactions between the server computers for the transfer or goods/services and/or the transfer of funds.

The term "node" may refer to a computing device within a cryptocurrency system. A node in a cryptocurrency system may be associated with and/or operated by a financial institution server computer of a financial institution (e.g., bank). Each node may have particular rights and restrictions associated with the node. For example, an issuer node may have the right to generate and issue digital currency within a cryptocurrency payment network, while a distributor node may have the right to distribute digital currency, but not generate or issue digital currency. Other nodes in the cryptocurrency payment network, such as merchants and users (e.g., consumers), may have the right to transfer digital currency.

The term "ledger of transactions" may refer to a compilation of data from previous transactions. The ledger of transactions may be a database or other comparable file structure that may be configured to store data from all previous transactions performed using a digital currency, including the date and time of the transaction, the transaction amount, and the participants of the transaction (e.g., the sender and the receiver of the transaction amount). In some embodiments, the ledger of transactions may be a block chain where each new block in the block chain is algorithmically determined based on new transactions and previous blocks in the block chain. In some embodiments, each node within a cryptocurrency payment network may store their own copy of the ledger of transactions. In other embodiments, only some nodes store their own copy of the ledger of transactions.

The term "digital certificate" may refer to data used as part of a verification process. A digital certificate may be used to send information to from one entity to another entity. The digital certificate may be used to verify that the entity sending a message is authentic. In some embodiments, a digital certificate may include data indicating a digital certificate version, a serial number, an algorithm identifier, a name of the issuing certificate authority (e.g., a management system), an expiration date, a copy of the node verification public key, and the digital signature of the issuing certificate authority so that a recipient (e.g., the node) can verify that the certificate is authentic.

The term "digital signature" may refer to an electronic signature for a message. In some embodiments, the digital signature may be used to validate the authenticity of a transaction message sent within a cryptocurrency payment network. A digital signature may be a unique value generated from a message and a private key using an encrypting algorithm. In some embodiments, a decrypting algorithm using a public key may be used to verify the signature. The digital signature may be a numeric value, an alphanumeric value, or any other type of data including a graphical representation.

The term "key" may refer to a piece of data or information used for an algorithm. A key may be a unique piece of data and is typically part of a key pair where a first key (e.g., a private key) may be used to encrypt a message, while a second key (e.g., a public key) may be used to decrypt the encrypted message. The key may be a numeric or alphanumeric value and may be generated using an algorithm. A management system server computer in a cryptocurrency payment network may generate and assign a unique key pair for each node in the cryptocurrency payment network. In some embodiments, a key may refer to either a node verification key pair or a transaction key pair.

A transaction key pair may include a transaction public key and a transaction private key. The transaction key pair may be used by the nodes and/or payment entities to conduct transactions in the cryptocurrency payment network. The transaction key pair may be generated by a management system server computer or may be generated by a financial institution server computer for a payment entity when an account with the financial institution server computer is created. The transaction public key of a node may be distributed throughout the cryptocurrency payment network in order to allow for authentication of payment transaction messages signed using the private key of the node.

A node verification key pair may include a node verification public key and a node verification private key. The node verification key pair may be used by the nodes and the management system to verify that a node is an issuer node or a distributor node. The node verification key pair may be generated by a management system server computer in response to a request message from a node to be designated an issuer node or a distributor node in the cryptocurrency payment network. In other embodiments, the node verification key pair may be generated by a node (e.g., a financial institution server computer) and sent to the management system server computer. In some embodiments, a node verification public key may be functionally similar to a transaction public key. However, the node verification public key may only be distributed to the node associated with the node verification public key. In such embodiments, the node verification public key may be encrypted prior to being sent to the appropriate node.

The term "user computing device" may refer to a computing device that is associated with a user. In some embodiments, the user computing device can be used to communicate with another device, computer, or system. It can include a user computing device that is used to conduct a transaction. The user computing device may be capable of conducting communications over a network. A user computing device may be in any suitable form. For example, suitable user computing devices can be hand-held and compact so that it can fit into a user's wallet and/or pocket (e.g., pocket-sized). The user computing device can include a processor, and memory, input devices, and output devices, operatively coupled to the processor. Specific examples of user computing devices include cellular or mobile phones, tablet computers, desktop computers personal digital assistants (PDAs), pagers, portable computers, smart cards, and the like. Additional user computing devices may include wearable devices, such as smart watches, glasses fitness bands, ankle bracelets, rings, earrings, etc. In some embodiments, the user computing device may include automobiles with remote communication capabilities.

The term "identifier" may refer to any information that may be used to identify information. In some embodiments, the identifier may be a special value generated randomly or according to a predetermined algorithm, code, or shared secret. For example, an account identifier may be used to uniquely identify an account. In some embodiments, the identifier may be one or more graphics, a token, a bar code, a QR code, or any other information that may be used to uniquely identify an entity.

The term "transaction" may include an exchange or interaction between two entities. In some embodiments, a transaction may refer to a transfer of value between two users (e.g., individuals or entities). A transaction may involve the exchange of monetary funds (e.g., digital currency), or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data or information across a communications channel. Examples of non-financial transactions may include transactions for verifying an identity of a server computer and/or rights and restrictions associated with the server computer.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

The term "profile" may refer to information regarding an entity. In some embodiments, the profile may be a representation of information regarding the entity, including rights and restrictions, identification data, and verification data. For example, a profile for a financial institution server computer may include data indicating the type of node the financial institution server computer is within a cryptocurrency payment network. In some embodiments, the profile may be stored in a database and be linked to an identifier associated with the entity the profile is related to. An entity may have one or more profiles.

The term "financial institution server computer" may refer to a computer associated with a financial institution. Examples of financial institution server computers may include an access device, terminal, or a web server computer hosting a financial institution server Internet website. The financial institution server computer may be in any suitable form. Additional examples of financial institution server computers include any device capable of accessing the Internet, such as a personal computer, cellular or wireless phones, personal digital assistants (PDAs), tablet PCs, and handheld specialized readers.

The term "database" may include any hardware, software, firmware, or combination of the preceding for storing and facilitating the retrieval of information. In addition, the database may use any of a variety of data structures, arrangements, and compilations to store and facilitate the retrieval of information.

The term "payment processing server computer" may include a server computer used for payment processing. In some embodiments, the payment processing server computer may be coupled to a database and may include any hardware, software, other logic, or combination of the preceding for servicing the requests from one or more client computers. The payment processing server computer may comprise one or more computational apparatuses and may use any of a variety of computing structures, arrangements, and compilations for servicing the requests from one or more client computers. In some embodiments, the payment processing server computer may operate multiple server computers. In such embodiments, each server computer may be configured to process transaction for a given region or handles transactions of a specific type based on transaction data.

The payment processing server computer may include data processing subsystems, networks, and operations used to support and deliver authorization services, exception file services, and clearing and settlement services. An exemplary payment processing server computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing server computer may use any suitable wired or wireless network, including the Internet.

The payment processing server computer may process transaction-related messages (e.g., authorization request messages and authorization response messages) and determine the appropriate destination computer (e.g., issuer computer) for the transaction-related messages. In some embodiments, the payment processing server computer may authorize transactions on behalf of an issuer. The payment processing server computer may also handle and/or facilitate the clearing and settlement of financial transactions.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

Embodiments of the present invention may be directed at integrating a management system server computer into a cryptocurrency payment network. In such embodiments, the management system server computer may manage the rights and restrictions granted to nodes within the cryptocurrency payment network. Some nodes in the cryptocurrency payment network may be issuer nodes that are granted the right to issue and generate digital currency, while other nodes may be distributor nodes that are granted the right to distribute digital currency. In some embodiments, the distributor nodes are run by financial institutions such as banks, and the issuer nodes are run by financial institutions such as central banks or government agencies.

In some embodiments, end users (e.g., consumers, merchants) may not be allowed to become nodes in the cryptocurrency payment network, and thus cannot be granted the right to issue or generate digital currency.

Thus, embodiments of the invention introduce a digital currency system that provides some benefits of traditional fiat currencies together with some benefits of digital currencies, while reducing the possibilities of theft, hacking, criminality, and improperly controlled pricing present in current digital currency systems.

I. Systems

FIG. 1 shows a block diagram of an exemplary system 100 including a cryptocurrency payment network 145 according to an embodiment of the present invention. The system 100 in FIG. 1 includes a first payment entity 155A comprising a first end user 125A with a first user computing device 130A, a second payment entity 155B comprising a second end user 125B with a second user computing device 130B, one or more issuer nodes 105A-105N, one or more distributor nodes 120A-120M, and a management system server computer 150. In some embodiments, the first end user 125A and the second end user 125B may be one of an individual user, a business entity, and an organization. Each of these systems and computers may be in operative communication with each other via any suitable communication medium (including the Internet), using any suitable communications protocol. In the embodiment shown in FIG. 1, the systems and computers are shown to interact via one or more communication networks 115 (e.g., one or more of the Internet, private communication networks, and public communication networks).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. Thus, in FIG. 1, the inclusion of dotted lines indicates optional features that serve as a reminder that the number of these entities included in various embodiments is flexible. Similarly, the use of "N" and "M" when referring to the issuer nodes 105A-105N and distributor nodes 120A-120M is suggestive to indicate that there may be any number of these entities in various embodiments, and further that there need not be the same number of issuer nodes 105A-105N and distributor nodes 120A-120M in various cryptocurrency payment network 145 configurations.

The user computing devices 130A-130B may be in any suitable form. For example, suitable user computing devices may be hand-held and compact so that they can fit into a user's pocket. Examples of user computing devices 130A-130B may include any device capable of accessing the Internet. Specific examples of user computing devices 130A-130B include cellular or wireless phones (e.g., smartphones), tablet phones, tablet computers, laptop computers, desktop computers, terminal computers, work stations, personal digital assistants (PDAs), physical cryptocurrency wallet hardware, pagers, portable computers, smart cards, and the like. In some embodiments of the invention, the user computing devices 130A-130B and a payment device associated with the user may be a single device (e.g., a mobile phone).

The user computing devices 130A-130B may include a processor and a computer readable medium coupled to the processor, the computer readable medium comprising code, executable by the processor for performing the functionality described herein. The user computing devices 130A-130B may transmit data through the communication networks 115 to issuer nodes 105A-105N, distributor nodes 120A-120M, and to the other user computing devices 130A-130B. For example, the first user computing device 130A may be communicatively coupled to the second user computing device 130B via the communication networks 115 in order to conduct a transaction with a merchant associated with the second user computing device 130B.

In some embodiments, the cryptocurrency payment network 145 may comprise one or more server computers (not illustrated) implementing the issuer nodes 105A-105N and the distributor nodes 120A-120M. In some embodiments, each issuer node 105A-105N and distributor node 120A-120M may be a server computer associated with a separate financial institution. For example, each issuer node 105A-105N may be associated with a central bank, federal reserve, or government authority, while each distributor node 120A-120M may be associated with a different commercial bank. In various embodiments, each issuer node and/or distributor node may be implemented by a separate computing device (e.g., server computer). However, in some embodiments, a single server computer may implement multiple issuer nodes and/or distributor nodes. The issuer nodes 105A-105N and the distributor nodes 120A-120M may include a processor and a computer readable medium coupled to the processor, the computer readable medium comprising code, executable by the processor for performing the functionality described herein.

In some embodiments, each of the distributor nodes 120A-120M may be implemented by one or more server computers that maintain user profiles and/or account data (e.g., financial account data) for one or more of the end users 125A-125B. For example, in some embodiments, each of the distributor nodes 120A-120M is hosted by a respective financial institution (e.g., a bank), and thus each distributor node 120A-120M may have an explicit relationship with one or more of the end users 125A-125B through a financial account, where the end user may have provided information to the financial institution (e.g., name, address, phone number, demographic information, government identification data such as a Social Security Number (SSN), etc.).

As noted above, the cryptocurrency payment network 145 may be comprised of issuer nodes 105A-105N and distributor nodes 120A-120M in communications via the communications network 115. In some embodiments, each of these node may be granted the rights and ability to participate in the cryptocurrency payment network 145 by the management system server computer 150. In such embodiments, the management system server computer 150 may be configured to generate and distribute digital certificates, including a node verification public key, to each of the nodes to allow the nodes to function in the cryptocurrency payment network 145. The node verification public key may be part of a node verification key pair, which may include a node verification private key. The node verification key pair may be an asymmetric key pair such that the node verification public key may be used to encrypt a message sent from a node to the management system server computer 150, and the corresponding node verification private key for that node may be used by the management system server computer 150 to decrypt the message.

The node verification key pair may be generated by a management system server computer 150 in response to a request message from a node to be designated an issuer node or a distributor node in the cryptocurrency payment network 145. In other embodiments, the node verification key pair may be generated by a node (e.g., a financial institution server computer) and sent to the management system server computer 150. In some embodiments, node verification public keys may be sent to the issuer nodes 105A-105N and distributor nodes 120A-120M by encrypting each of the node verification public key such that only the associated node can decrypt their node verification public key.

In some embodiments, each of the issuer nodes 105A-105N and each of the distributor nodes 120A-120M may maintain a ledger 115A-115M of the payment transactions made in the cryptocurrency payment network 145. In some embodiments, the ledgers 115A-115M may include a list of transactions with each entry including a sender address, a receiver address, and an amount of digital currency for each transaction. In some embodiments, the ledger may include a record of all transactions ever performed using the digital currency.

In some embodiments, a payment transaction may only be considered "official" and successfully processed when the payment transaction is recorded in (all or one or more of) the ledgers 115A-115M. Thus, in some embodiments, all payment transaction messages need to be transmitted to the nodes maintaining the ledgers 115A-115M. In some embodiments, a payment entity (e.g., 155A) transmits a payment transaction message to each of the nodes maintaining a ledger, but in other embodiments the payment entity 155A may transit the payment transaction message to just one of these nodes (which in turn forwards it to the other ledger-maintaining nodes) or to another computing device specially configured to provide payment transaction messages to the ledger-maintaining nodes. In some embodiments, only a subset of the nodes may maintain a ledger (e.g., only distributor node 120B) or entirely different entities altogether may maintain the ledger.

The nodes and payment entities within the cryptocurrency payment network 145 may use a "digital signature" for performing transactions (e.g., transferring digital currency), which is based upon the use of digital certificate. A digital certificate, in embodiments of the invention, may utilize a transaction key pair (e.g., a transaction public key and a transaction private key). In some embodiments, each node can use the transaction private key to generate a digital signature (and thus, a payment message), and the node's transaction public key can be made publicly available (e.g., to other nodes in the cryptocurrency payment network 145) to allow other nodes to verify the authenticity of the payment transaction, and correspondingly record the payment transaction in their respective ledgers. In some embodiments, the transaction public key may be a "destination address" identifying a recipient of a digital currency payment. For example, when a first payment entity 155A wishes to send digital currency to a second payment entity 155B, the first payment entity 155A generates a digital signature by: (1) creating a payment message identifying some digital currency held by the first payment entity 155A and also identifying the recipient the funds (e.g., using a transaction public key of the second payment entity 155B), (2) encrypting the payment message using the transaction private key of the first payment entity 155A, (3) and sending the encrypted payment message to the second payment entity 155B and to the other nodes in the cryptocurrency payment network 145. The other entities (e.g., nodes, payment entities, etc.) in the cryptocurrency payment network 145 may then use the transaction public key of the first payment entity 155A to verify that the amount of digital currency is valid and has been transferred to the second payment entity 155B by the first payment entity 155A. Once the transaction is verified, the transaction may be published into ledgers (e.g., ledger 115A-115M) maintained by the one or more nodes in the cryptocurrency payment network 145.

In some embodiments, an issuer node 105A may be granted a digital certificate (e.g., 110A) by the management system server computer 150. The issuer node 105A can use this digital certificate to initiate the process of generating digital currency. There are a variety of ways to generate additional digital currency, including but not limited to the issuer node 105A creating a new payment transaction to itself, and creating new payment transactions to any of the distributor nodes 120A-120M, etc. In some embodiments, these payment transactions reference completely new currency that has not previously existed until that payment transaction—the issuer nodes 105 are able to "generate" or invent new digital currency simply by the authority granted to it by the management system server computer 150. Embodiments of the invention allow for the use of many different types of digital certificates and cryptographic algorithms known to those of skill in the art, including but not limited to the use of Elliptic Curve Digital Signature Algorithm (ECDSA), the Secure Hash Algorithm (SHA) family of cryptographic hash functions (e.g., SHA-1 family, SHA-2 family, SHA-3 family, etc.), the Scrypt algorithm, etc.

In some embodiments, a distributor node 120A may also be granted a digital certificate (e.g., 110B) by the management system server computer 150. The distributor node 120A can use this digital certificate, after receiving an amount of digital currency from an issuer node 105A, to distribute an amount of the of the digital currency to one of the payment entities (e.g., 155A, 155B) or to another distributor node (e.g., 120B-120M). For example, the distributor node 120A can create a new payment transaction to the first payment entity 155A by generating a digital signature by: (1) creating a payment message identifying some of the received digital currency held by the distributor node 120A and also identifying the recipient the funds (e.g., using a transaction public key or destination address of the first payment entity 155A), (2) encrypting the payment message using the transaction private key of the distributor node 120A, (3) and sending the encrypted payment message to the first payment entity 155A and to the other nodes in the cryptocurrency payment network 145. Other entities (e.g., nodes, payment entities, etc.) in the cryptocurrency payment network 145 may then use the transaction public key of the first payment entity 155A to verify that the amount digital currency is valid and has been transferred to the second payment entity 155B by the distributor node 120A. Once the transaction is verified, the transaction may be published into ledgers (e.g., ledger 115A-115M) maintained by the one or more nodes in the cryptocurrency payment network 145.

Figure 2:
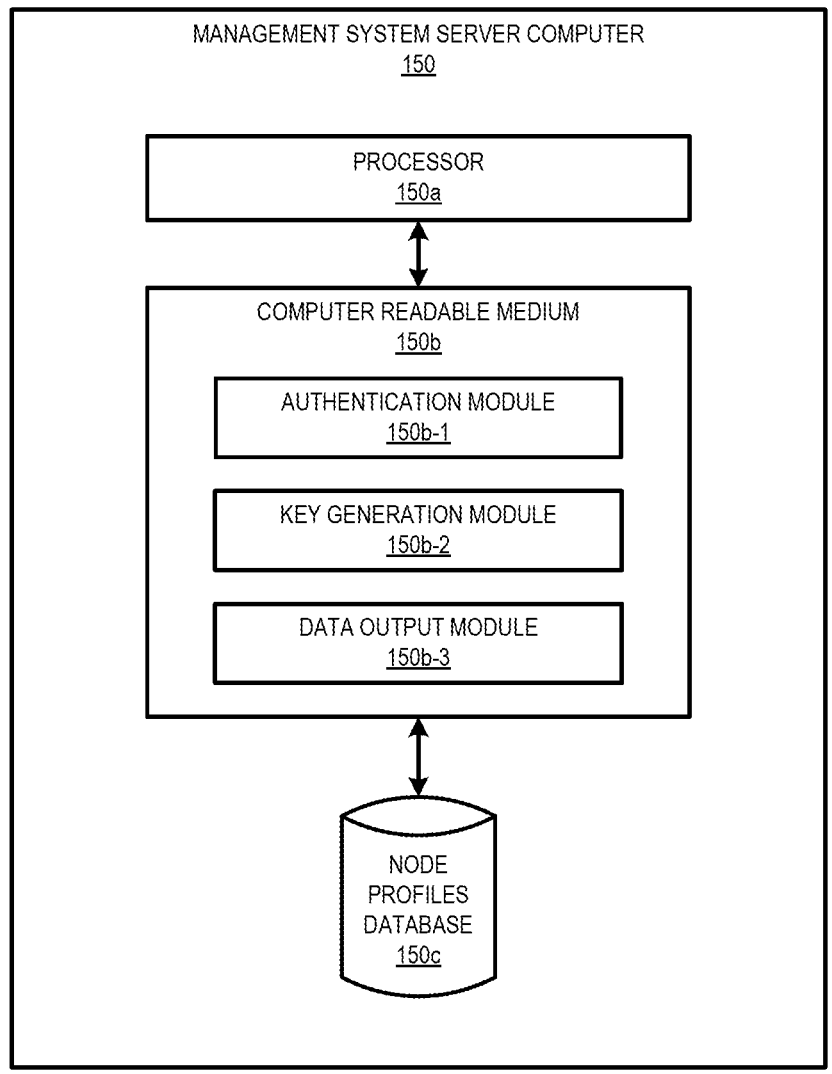
FIG. 2 shows a detailed block diagram for a management system server computer according to an embodiment of the present invention.

FIG. 2 shows a detailed block diagram for a management system server computer 150 according to an embodiment of the present invention. In some embodiments, the management system server computer 150 may be associated or operated by a payment processing system. The management system server computer 150 may be a single server computer or network of computers. The management system server computer 150 may include a processor 150a and a computer readable medium 150b coupled to the processor 150a, the computer readable medium 150b comprising code, executable by the processor 150a for performing the functionality described herein.

The computer readable medium 150b may comprise code for a plurality of modules, including an authentication module 150b-1, a key generator module 150b-2, and a data output module 150b-3.

The processor 150a and the authentication module 150b-1 may be configured to perform authentication processes for financial institution server computers. The authentication processes may include determining whether a request message received from a financial institution server computer is from a financial institution that should be granted the rights of an issuer node or a distributor node. This may be determined based on a bank identification number (BIN) or other identifier indicating whether the financial institution associated with the financial institution server computer is a central bank or a commercial bank. In some embodiments, the authentication process may also include authenticating a request message from a node to determine whether the node is an issuer node or a distributor node. In such embodiments, the processor 150a and the authentication module 150b-1 may evaluate a received message encrypted using a first key of a key pair (e.g., a node verification public key) by decrypting the message using a stored second key of the key pair (e.g., a node verification private key).

The processor 150a and the key generator module 150b-2 in the management system server computer 150 may be configured to generate a unique node verification key pair for each of the issuer nodes 105A-105N and distributor nodes 120A-120M. For example, a first key of the key pair may (e.g., a node verification public key) be sent to a node, and a second key of the key pair (e.g., a node verification private key) may be stored in a profile for the node in a node profiles database 150c at the management system server computer 150. The key pair may be used to identify the node as being either an issuer node or a distributor node such that when the node makes a request to generate or issue digital currency, the management system server computer 150 may determine whether the node is an issuer node that is authorized to generate and issue digital currency, or whether the node is a distributor node that is not authorized to generate or issue digital currency. In some embodiments, the node verification key pair may be an asymmetric key pair. However, in other embodiments, the node verification key pair may be generated using any other appropriate algorithms.

The processor 150a and the data output module 150b-3 may be configured to generate and send messages to the issuer nodes 105A-105N and to the distributor nodes 120A-120M in the cryptocurrency payment network 145. The data output module 150b-3 may generate and send response messages to the nodes in response to received request messages to generate node verification key pairs and/or request messages indicating that a node is requesting to issue or generate an amount of digital currency. In some embodiments, the response message generated and sent by the data output module 150b-3 may include a first key of a key pair (e.g., a node verification public key) used to identify the node as an issuer node or a distributor node. In other embodiments, the response message generated and sent by the data output module 150b-3 may include an indication as to whether the node that sent the request message is an issuer node and authorized to issue and generate the digital currency.

In some embodiments, the management system server computer 150 may be coupled to one or more databases and may include any hardware, software, other logic, or combination of the preceding for servicing the requests from one or more client computers. For example, the management system server computer 150 may be coupled to a node profiles database 150c. The node profiles database 150c may store a profile for each node within the cryptocurrency payment network 145. The profile for each node may include the unique second key of the key pair (e.g., a node verification private key) associated with the mode and associated with the first key of the key pair sent to the node. The profile may also include information regarding the node and the rights and restrictions associated with the node (e.g., whether the node is an issuer node or a distributor node), a name of the financial institution associated with the node, and other identifying information (e.g., a bank identification number).

The management system server computer 150 may comprise one or more computational apparatuses and may use any of a variety of computing structures, arrangements, and compilations for servicing the requests from one or more client computers. In some embodiments, the management system server computer 150 may operate multiple server computers.

As noted previously, each payment entity (e.g., first payment entity 155A) may be comprised of an end user (e.g., first end user 125A) with a user computing device (e.g., first user computing device 130A). In some embodiments, the first user computing device 130A may store a digital wallet application that may be used to store digital currency and to access the cryptocurrency payment network 145 in order to perform transactions using the digital currency.

II. Methods

Figure 3:
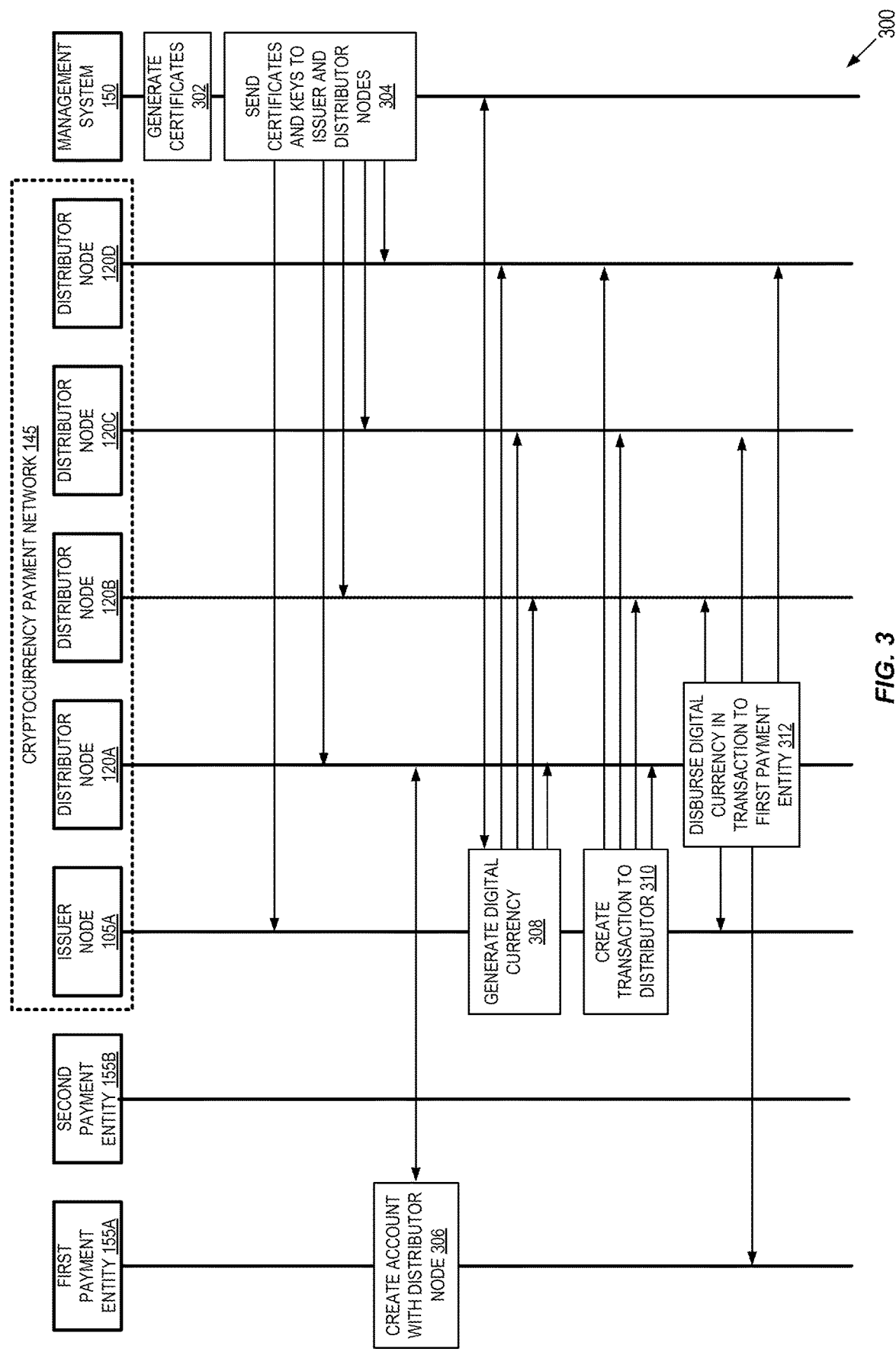
FIG. 3 shows a sequence diagram of a method of certificate generation and distribution, digital currency generation, and digital currency distribution according to an embodiment of the present invention.

FIG. 3 shows a sequence diagram 300 of a method of certificate generation and distribution, digital currency generation, and digital currency distribution according to an embodiment of the present invention. Additional methods and processes may be included within these methods and may be recognized by one of ordinary skill in the art, in light of the description below. Further, in some embodiments of the present invention, the described methods may be combined, mixed, and matched, as one of ordinary skill would recognize. In addition, although a single issuer node 105A and four distributor nodes 120A-120D are depicted in FIG.

3, in other embodiments there may be a fewer number or a greater number of such components.

In step 302, the management system server computer 150 generates digital certificates for an issuer node 105A and distributor nodes 120A-120D. Each of the issuer node 105A and the distributor nodes 120A-120D may be associated or managed by a different financial institution server computer. In some embodiments, the management system server computer 150 may receive a request from one of the financial institution server computers requesting that the requesting financial institution server computer be designated as a node in the cryptocurrency payment network 145. In such embodiments, the management system server computer 150 may determine the type of financial institution associated with the financial institution server computer. For example, the financial institution may be a central bank, a reserve bank or government agency, such as the European Central Bank of the Federal Reserve of the United States. On the other hand, the financial institution may be a commercial bank (e.g., Wells Fargo, Citibank).

In order to determine whether to generate a digital certificate designating the requesting financial institution server computer as an issuer node or a distributor node, the management system server computer 150 may first determine the rights and restrictions associated with each financial institution based on the type of financial institution. Where the financial institution is a central bank or reserve bank, the financial institution server computer associated with the financial institution may be designated as an issuer node in the cryptocurrency payment network 145, with the rights to issue and generate digital currency. Where the financial institution is a commercial bank, the financial institution server computer associated with the financial institution may be designated as a distributor node in the cryptocurrency payment network 145, with the rights to distribute digital currency but not to issue or generate digital currency.

In some embodiments, only financial institutions can act as nodes within the cryptocurrency payment network 145. In such embodiments, payment entities (e.g., users/consumers and merchants) may not be granted any node rights by the management system server computer 150 and thus may not be designated as either issuer nodes or distributor nodes.

Once the management system server computer 150 has determined the type of node that the requesting financial institution server computer may be designated as, the management system server computer 150 may generate a unique digital certificate and a node verification key pair for the financial institution server computer. In some embodiments, the first key and the second key (e.g., the node verification public and the node verification private key, respectively) may be generated using an asymmetric key pair algorithm. However, the first key and the second key may also be generated using other means, as one of ordinary skill in the art would understand. In some embodiments, the keys of the node verification key pair may be a numeric or alphanumeric value.

For example, given a first financial institution server computer being a central bank, the management system server computer 150 may generate a first digital certificate and a first node verification key pair. A first key of the first node verification key pair (e.g., the node verification public key) may be associated with the first digital certificate, and a second key of the first node verification key pair (e.g., the node verification private key or first stored key) may be associated with a profile of the first financial institution server computer stored in a node profiles database 150c.

In some embodiments, the node verification key pair may be akin to a public and private key pair, with the first key being equivalent to a public key. However, in some embodiments, the first key may differ from a typical public key in that the first key may not be publicly disclosed or broadcast to any other entity or computer other than the node associated with the node verification key pair. In such embodiments, the first key may be encrypted prior to being sent to the first financial institution server computer via the communications network 115 to ensure that if the first key is intercepted, it cannot be used unless the interceptor has the appropriate decryption key. The first key is used by the first financial institution server computer to verify to the management system server computer 150 that the first financial institution server computer is an issuer node and thus has the right to issue and generate digital currency. In some embodiments, there may be a plurality of financial institution server computers that may operate as issuer nodes in the cryptocurrency payment network 145. In such embodiments, the process described above may be repeated for each such issuer node.

A similar process as described above may be performed for a second financial institution server computer (e.g., associated with node 120A) that is a commercial bank. In such a situation, the management system server computer 150 may generate a second digital certificate and a second node verification key pair, with the second node verification key pair used to designate and indicate that the second financial institution server computer is a distributor node. The process may be repeated for each of a plurality of financial institution server computers (e.g., nodes 120B-120D) requesting to be nodes in the cryptocurrency payment network 145.

In step 304, the management system server computer 150 sends a generated digital certificate to the issuer node 105A. In some embodiments, the management system server computer 150 may send the digital certificate including the first key of the first node verification key pair to the issuer node 105A via a communications network 115. In other embodiments, the management system server computer 150 may send the digital certificate including the first key via any other appropriate communications means or by physically transmitting a computer readable medium to the issuer node 105A.

The management system server computer 150 may also send unique digital certificates generated by the management system server computer 150 to each of the distributor nodes 120A-120D. Once the management system server computer 150 has determined that the financial institution server computers associated with nodes 120A-120D are distributor nodes, the management system server computer 150 may send a unique digital certificate including a unique node verification public key to each of nodes 120A-120D. The management system server computer 150 may send the digital certificates including the node verification public keys via a communications network 115 or any other appropriate communications means.

Once the issuer node 105A and the distributor nodes 120A-120D have been established, the cryptocurrency payment network 145 may be configured for operation. In some embodiments, additional nodes may be added or removed from the cryptocurrency payment network 145 at any time, and any of these above-described steps may again be performed by the management system server computer 150.

In step 306, a first payment entity 155A creates an account with a distributor node 120A. In some embodiments, the account creation process may include the first payment entity 155A providing the distributor node 120A with identifying information of the first end user 125A associated with the first payment entity 155A, including a first name, a last name, a government-issued identification number such as a driver's license number, passport number, or social security number, a date of birth, a residential and/or business address, a phone number, an account username, an account password, an email address, etc.

In step 308, the issuer node 105A may perform the steps to generate and issue digital currency. In some embodiments, the financial institution server computer associated with the issuer node 105A may generate a request message for generating and issuing digital currency. In some embodiments, this process may occur algorithmically (e.g., according to a schedule, according to market conditions, according to a value of an associated fiat currency) or at the request of a user controlling the issuer node 105A. In some embodiments, the request message may include an amount of the digital currency the issuer node 105A wants to generate and a first key (e.g., a node verification public key) of a node verification key pair associated with the issuer node 105A. The issuer node 105A may then send the request message to the management system server computer 150 via the communications network 115.

After receiving the request message from the issuer node 105A, the management system server computer 150 may determine whether the issuer node 105A is authorized to generate and issue digital currency. In some embodiments, the management system server computer 150 may retrieve a node profile associated with the issuer node 105A from the node profiles database 150c using a bank identification number or other identifying information. In some embodiments, the management system server computer 150 may retrieve a second key (e.g., a node verification private key) of the node verification key pair from the retrieved profile for the issuer node 105A. The processor and an authentication module 150b-1 may determine from the received first key and the retrieved second key whether the request message was received from an authorized issuer node 105A. In some embodiments, the request message may be encrypted by the node verification public key prior to being sent by the issuer node 105A. The determination as to whether the request message was made by an authorized issuer node may be made by using a second key (e.g., a node verification private key) stored at management system server computer 150 to decrypt the encrypted request message. In other embodiments, an algorithm may be used to determine whether the first key matches the second key. Once the management system server computer 150 has determined that the request message from the issuer node 105A is valid and authenticated (e.g., was received from an authenticated issuer node), the management system server computer 150 may generate and send a response message to the issuer node 105A indicating such.

In some embodiments, after the management system server computer 150 has determined that the issuer node 105A is authorized to issue the digital currency, the management system server computer 150 may update a log of valid digital currencies that are operating within the cryptocurrency payment network 145. In such embodiments, the log may be periodically distributed to the nodes in the cryptocurrency payment network 145 to indicate to the nodes the digital currencies that are authorized and can be trusted. In such embodiments, where the management system server computer 150 determines that the a request is received by a unauthorized node (e.g., a distributor node or another entity), the management system server computer 150 may not add the digital currency to the log. Even where the node may try to issue digital currency, the fact that it is not listed in the log distributed to the cryptocurrency payment network 145 may act as an indication to the nodes in the cryptocurrency payment network 145 that this digital currency should not be trusted.

In some embodiments, the management system server computer 150 may revoke the digital certificate issued to a node and identifying information for the node (e.g., a bank identification number or other identifier) may be placed on a publicly accessible or distributed revocation list. For example, if an issuer node is issuing too much digital currency or issued digital currency when it was not authorized by the management system server computer 150, the user may be placed on revocation list. In other embodiments, the management system server computer 150 may allow the digital certificate to expire and not provide a renewal digital certificate. Thus, when a payment transaction message includes digital currency that was previously issued by a node that is currently not an authorized issuer node, other nodes in the cryptocurrency payment network 145 may not consider the digital currency as trustworthy.

Assuming the issuer node 105A has been authorized to issue the digital currency, when the issuer node 105A receives the response message from the management system server computer 150 indicating that the issuer node 105A is authorized to generate and issue digital currency, the issuer node 105A may then generate the digital currency. In some embodiments, the issuer node 105A may generate and issue digital currency by establishing an amount of digital currency to create and a currency conversion rate between a unit of the digital currency and a fiat currency (e.g., the U.S. Dollar, the British Pound). For example, one unit of the digital currency may be the equivalent to one U.S. Dollar.

The issuer node 105A may generate the digital currency in a variety of ways, including but not limited to sending the amount of digital currency to itself as part of a payment transaction and advertising the payment transaction throughout the cryptocurrency payment network 145. For example, the issuer node 105A may generate a first payment transaction message with the source and destination address of the first payment transaction message being the address of the issuer node 105A. The first payment transaction message may include an amount of digital currency (e.g., 100 units) and a digital signature. In some embodiments, the digital signature may be generated using a mathematical algorithm. The digital signature may be created by using a transaction private key associated with the sender (e.g., issuer node 105A) and the first payment transaction message. In such a scenario, a transaction public key associated with the sender (e.g., issuer node 105A) may then be used to verify the digital signature to ensure that the payment transaction is authentic and was an authorized transaction.

The issuer node 105A may also send the first payment transaction message to the other nodes (e.g., 120A-120D) in the cryptocurrency payment network 145 to indicate that the digital currency, including the amount of digital currency, has been generated. The other nodes in the cryptocurrency payment network 145 can use the transaction public key of the issuer node 105A to verify the digital signature of the first payment transaction message. When the digital signature is verified, the payment transaction may be considered authentic and may be added to the ledgers of the other nodes.

In step 310, subsequent to generating the digital currency, the issuer node 105A may create a payment transaction to transfer an amount of the digital currency to one or more distributor nodes (e.g., 120A-120D). For example, assuming the issuer node 105A previously generated 100 units of the digital currency, the issuer node 105A may want to transfer 50 units of the digital currency to distributor node A 120A. In order to distribute the 50 units of the digital currency to distributor node A 120A, the issuer node 105A may generate a second payment transaction message including the address of the issuer node 105A, the address of distributor node A 120A, the amount of the digital currency (e.g., 50 units), and the digital signature. As noted above, the digital signature may be generated using a mathematical algorithm using the second payment transaction message and the transaction private key of the issuer node 105A.

In addition, the second payment transaction message may also reference the previous transaction processed in the first payment transaction message described above using a transaction number of the transaction. The other nodes (e.g., 120B-120D) in the cryptocurrency payment network 145 may then check the transaction number to verify that the issuer node 105A received at least 50 units of digital currency through the previous transaction. In some embodiments, the second payment transaction message may reference one or a plurality of previous transactions with values totaling at least the amount being transferred using the second payment transaction message. For example, transaction #23db2a45 may be for 20 units of digital currency from payment entity C to the issuer node 105A, transaction #5490eadc may be for 25 units of digital currency from the issuer node 105A to the issuer node 105A (e.g., indicating newly created digital currency), and transaction #432809c9 may be for 5 units of digital currency from payment entity D to the issuer node 105A. These transactions represent funding sources for the current transaction being processed. These transactions are merely exemplary and any combination of previous transactions may be used as funding sources for the transaction. The other nodes may then verify that these previous transaction total at least 50 units of digital currency to verify that the sender (e.g., the issuer node 105A) has at least 50 units of digital currency to send. In some embodiments, in order to perform and more secure transaction, the other nodes may use the data from the previous transactions to trace the digital currency back to the issuer node that issued the digital currency.

In some embodiments, the other nodes may also verify that the 50 units of digital currency represented by the three previous transactions have not been previously transacted. This is done in order to prevent double spending of the same digital currency.

Once the transaction has been validated by the other nodes, the other nodes may then record the transaction in their ledgers, by inputting an entry for the transaction including the sender address, the receiver address, and the amount of digital currency paid to the receiver in the transaction.

In step 312, the distributor node 120A may then distribute digital currency in a transaction to the first payment entity 155A. Following the above, the distributor node 120A may generate a third payment transaction message to distribute digital currency (e.g., 25 units) to the first payment entity 155A. The distributor node 120A may generate the third payment transaction message including the address of the distributor node 120A, the address of the first payment entity 155A (e.g., an address associated with the first user computing device 130A), the amount of the digital currency (e.g., 25 units), and the digital signature. As noted above, the digital signature may be generated using a mathematical algorithm using the third payment transaction message and the transaction private key of the distributor node 120A.

The other nodes (e.g., issuer node 105A and distributor nodes 120B-120D) may also receive the third transaction message and may verify the transaction between the distributor node 120A and the first payment entity 155A, and when verified, update their respective ledgers of transaction with a record containing the transaction details for the transaction between the distributor node 120A and the first payment entity 155A. This results in all of the nodes in the cryptocurrency payment network 145 recognizing that the 25 units of digital currency are now "owned" by the first payment entity 155A. Once the transaction has been validated by the nodes in the cryptocurrency payment network 145, the digital currency balance of the first payment entity 155A may be increased by the 25 units of digital currency transferred to the first payment entity 155A.

In some embodiments, prior to generating the second payment transaction message, the distributor node 120A may generate and send a request message to the management system server computer 150. The request message from the distributor node 120A may include an amount of the digital currency the distributor node 120A wants to distribute and a first key of a node verification key pair associated with the distributor node 120A (unique from the node verification key pair associated with the issuer node 105A described previously). The distributor node 120A may send the request message to the management system server computer 150 via the communications network 115. In such embodiments, the management system server computer 150 may determine whether the distributor node 120A is authorized to distribute digital currency. In some embodiments, the management system server computer 150 may retrieve a node profile associated with the distributor node 120A from the node profiles database 150c. In some embodiments, the management system server computer 150 may retrieve a second key of the node verification key pair associated with the distributor node 120A from the retrieved node profile for the distributor node 120A. The processor and an authentication module 150b-1 may determine from the received first key (e.g., a node verification public key) and the retrieved second key (e.g., a node verification private key) whether the request message was received from an authorized distributor node 120A. In some embodiments, the request message may be encrypted by the node verification public key prior to being sent by the distributor node 120A. The determination as to whether the request message was made by an authorized distributor node may be made by using a second key (e.g., a node verification private key) stored at management system server computer 150 to decrypt the encrypted request message. Once the management system server computer 150 has determined that the request message from the distributor node 120A is valid and authenticated, the management system server computer 150 may generate and send a response message to the distributor node 120A indicating such.

When the distributor node 120A receives the response message from the management system server computer 150 indicating that the distributor node 120A is authorized to distribute digital currency, the distributor node 120A may then generate the second payment transaction message as described above.

Figure 4:
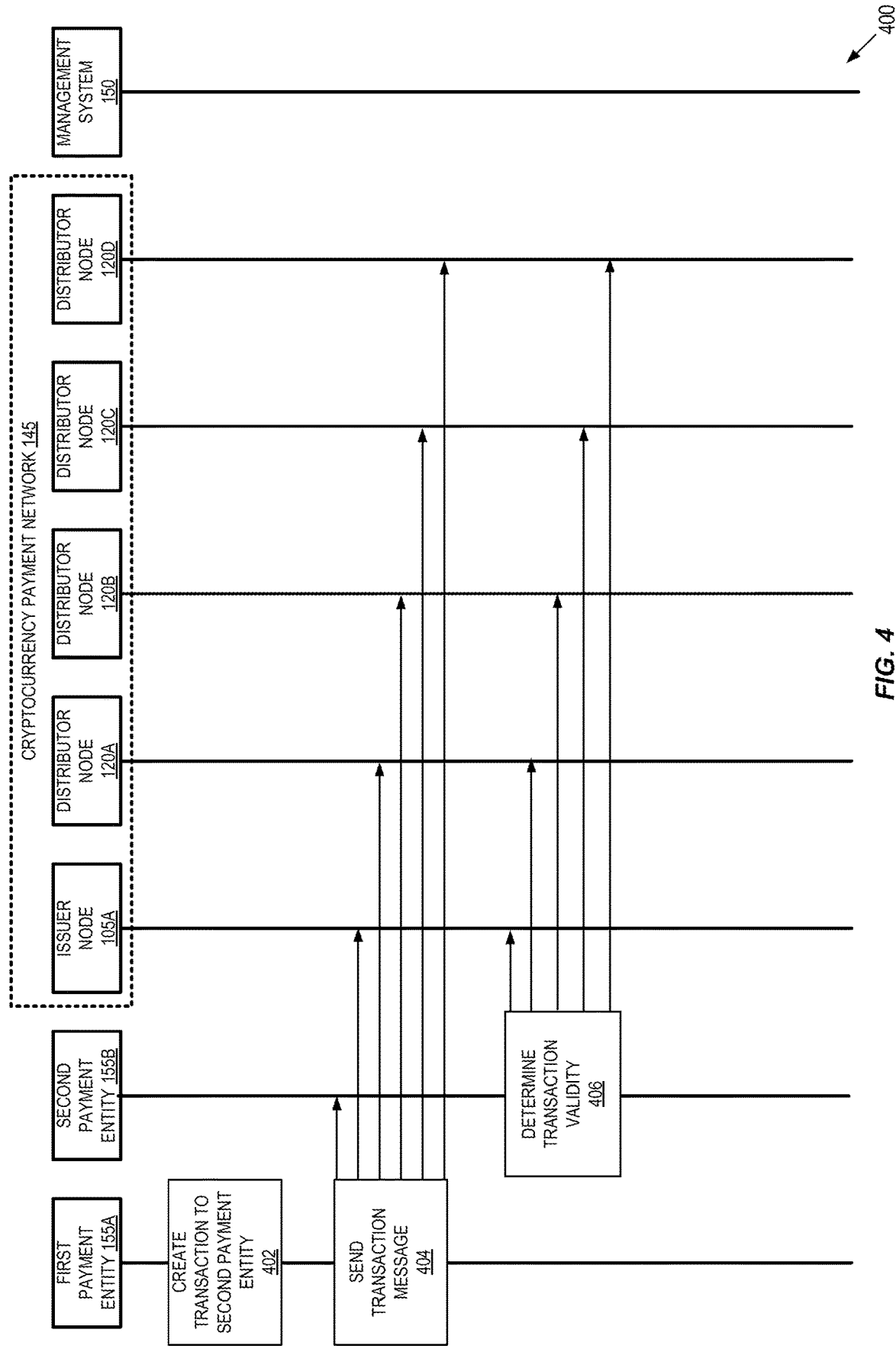
FIG. 4 shows a sequence diagram of a method of transferring digital currency between two payment entities according to an embodiment of the present invention.

FIG. 4 shows a sequence diagram 400 of a method of transferring digital currency between two payment entities according to an embodiment of the present invention. Additional methods and processes may be included within these methods and may be recognized by one of ordinary skill in the art, in light of the description below. Further, in some embodiments of the present invention, the described methods may be combined, mixed, and matched, as one of ordinary skill would recognize. In addition, although a single issuer node 105A and four distributor nodes 120A-120D are depicted in FIG. 3, in other embodiments there may be a fewer number or a greater number of such components.

In step 402, the first payment entity 155A creates a payment transaction message to send an amount of digital currency to the second payment entity 155B. For example, the first payment entity 155A may want to send 10 units of digital currency to the second payment entity 155B. The first payment entity 155A may generate the payment transaction message including the address of the first payment entity 155A (e.g., a first identifier of the first payment entity 155A), the address of the second payment entity 155B (e.g., an address associated with the second user computing device 130B, a transaction public key of the second payment entity 155B) (e.g., a second identifier of the second payment entity 155B), the amount of the digital currency (e.g., 10 units), and the digital signature. The digital signature may be a value (e.g., a numeric or alphanumeric value) generated using a mathematical algorithm or function using the payment transaction message and the transaction private key of the first payment entity 155A.

In step 404, the first payment entity 155A sends the payment transaction message to the second payment entity 155B. The first payment entity 155A may send the payment transaction message to the second payment entity 155B via a communications network 115.

The first payment entity 155A may also send the payment transaction message to the nodes (e.g., 105A, 120A-120D) in the cryptocurrency payment network 145 via the communications network 115. The payment transaction message may be sent to the nodes to indicate that the first payment entity 155A is sending 10 units of digital currency to the second payment entity 155B, as well as to allow the nodes in the cryptocurrency payment network 145 to verify and process the transaction.

In step 406, the issuer node 105A and the distributor nodes 120A-120D determine the validity of the transaction in the payment transaction message. The nodes in the cryptocurrency payment network 145 can use the transaction public key of the first payment entity 155A to verify the digital signature of the payment transaction message. When the digital signature is verified, the nodes may also determine whether the amount of digital currency in the transaction is properly owned by the first payment entity 155A and can be transferred by the first payment entity 155A. The nodes may determine whether the amount of digital currency is owned by the first payment entity 155A by evaluating previous transactions associated with the digital currency that are included in the payment transaction message. If the previous transaction data for the digital currency is incomplete or indicates that some or all of the digital currency is not owned by the first payment entity 155A, the transaction may be rejected.

Once the transaction has been verified by the one or more distributor nodes (120A-120M) and the one or more issuer nodes (105A-105N) in the cryptocurrency payment network 145, the ledger of transactions associated with each of the nodes may be updated with a record of the transaction between the first payment entity 155A and the second payment entity 155B. In such embodiments, an entry in the ledger may include the address of the first payment entity 155A, the address of the second payment entity 155B, and the amount of the digital currency sent to the second payment entity 155B. In some embodiments, the entry may include additional information related to the transaction, including transaction date and time, and a transaction identifier.

In some embodiments, payment transactions may be made that split, or sub-divide, units of digital currency into sub-units. For example, a payment transaction from the first payment entity 155A to a second payment entity 155B for 7-units of digital currency may be made using a 10-unit digital currency "coin" (e.g., a previous transaction) of the first payment entity 155A. Thus, the first payment entity 155A may generate a payment transaction message with the 10-unit coin as the source of the funds (the "input") and two digital currency destinations—7-units to the receiver address (e.g., the transaction public key) of the second payment entity 155B, and 3-units back to the address of the first payment entity 155A. Similarly, a payment transaction for 7.5 units may be made using an 8-unit "coin," in which 7.5 units will be directed to the recipient and 0.5 units will be directed back to the sender. Accordingly, some embodiments of the invention are configured to utilize/enforce a minimal unit size—thus, for example, a smallest amount of digital currency that can exist can be defined as 0.01 units. In some of these embodiments, if a payment transaction includes a split into a smaller amount of units than allowed (e.g., a split into 0.005 units when the smallest split size is 0.01 units), the other nodes that maintain ledgers may refuse to enter the transaction into their respective ledgers as the transaction does not follow the rules established for the digital currency.

In some embodiments where the value of the digital currency is explicitly tied to the value of a fiat currency (e.g., setting the value of a unit of digital currency as always being the same as a dollar), the cryptocurrency payment network 145 may be configured to utilize a same minimal split size as used in the fiat currency (e.g., $0.01 for U.S. Dollars, or 0.005 Tunisian Dinar, etc.). Thus, the ledger-maintaining nodes (e.g., the set of distributor nodes 120A-120D and the set of issuer nodes 105A), may disapprove or reject any payment transaction submitted for entry into the ledger (e.g., 115B) that includes an output amount having a smaller unit of currency than is configured as allowable.

Figure 5:
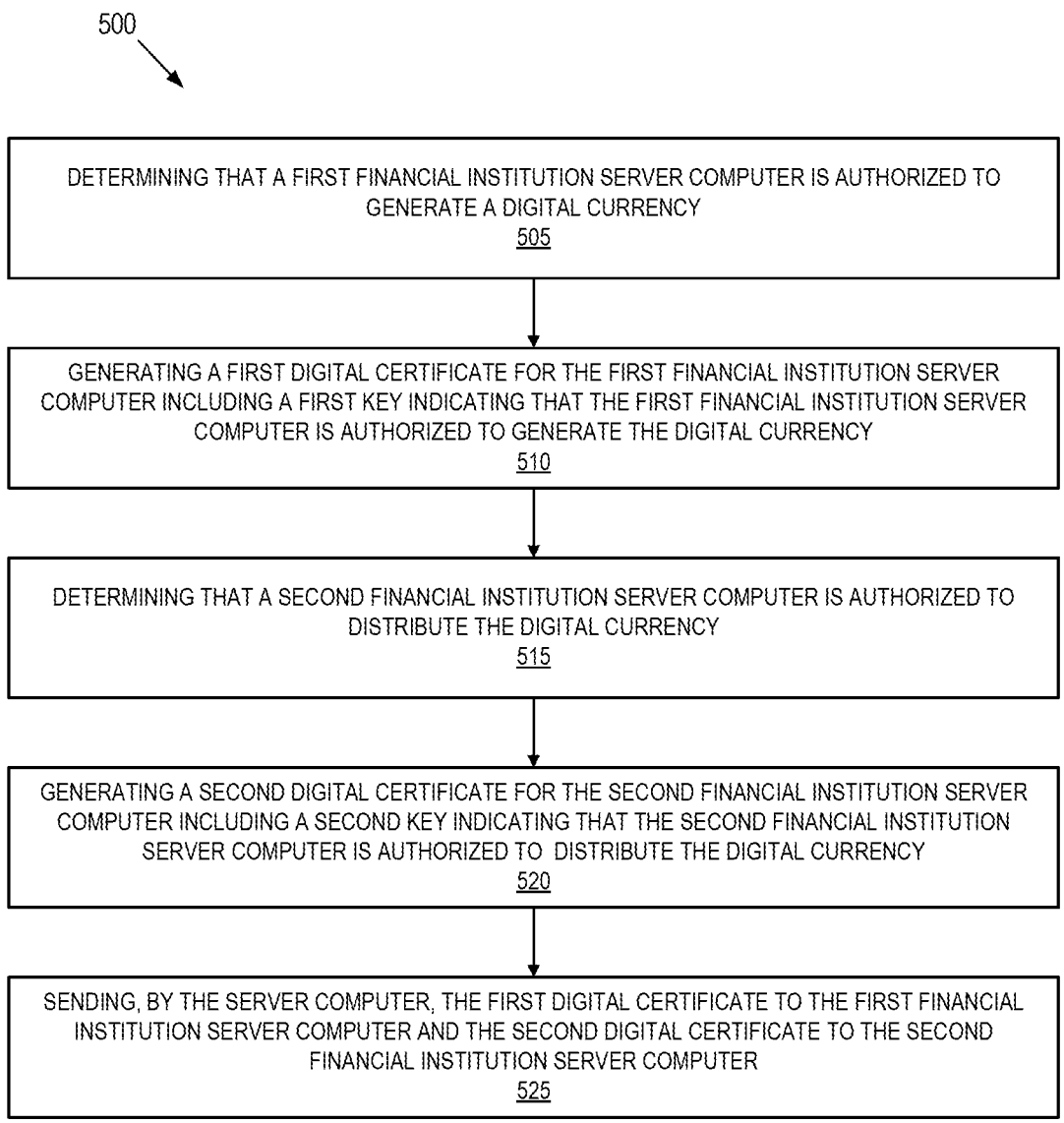
FIG. 5 shows a flowchart of a method for generating and distributing digital certificates to issuer nodes and distributor nodes in a cryptocurrency payment network according to an embodiment of the present invention.

FIG. 5 shows a flowchart of a method 500 for generating and distributing digital certificates to issuer nodes 105A and distributor nodes 120A-120M in a cryptocurrency payment network 145 according to an embodiment of the present invention.

In step 505, a server computer 150 in a management system determines that a first financial institution server computer (e.g., issuer node 105A) is authorized to generate a digital currency. As described in step 302 above, in some embodiments, the server computer 150 may receive a request from the first financial institution server computer requesting that the first financial institution server computer be designated as a node in the cryptocurrency payment network 145. In such embodiments, the server computer 150 may determine the type of financial institution associated with the first financial institution server computer. For example, the financial institution associated with the first financial institution server computer may be a central bank, a reserve bank or government agency, such as the European Central Bank of the Federal Reserve of the United States. On the other hand, the financial institution may be a commercial bank (e.g., Wells Fargo, Citibank).

The server computer 150 may determine whether the first financial institution server computer is authorized to generate the digital currency based on determining a first identifier associated with a first financial institution (e.g., bank identification number). The first identifier may be included in the request from the first financial institution server computer, and may provide an indication of the financial institution of the first financial institution. Where the financial institution is a central bank or reserve bank, the financial institution server computer associated with the financial institution may be designated as an issuer node in the cryptocurrency payment network 145, with the rights to issue and generate digital currency.

In step 510, the server computer 150 generates a first digital certificate for the first financial institution server computer. In some embodiments, the first digital certificate may include a first key (e.g., a node verification public key) that may be used to authenticate the first financial institution server computer as being authorized to generate and issue the digital currency The server computer 150 may also generate a first node profile (e.g., a first profile) for the first financial institution server computer in a node profiles database 150c. The server computer 150 may store a key correlated with the first key in the first node profile (e.g., a node verification private key). In some embodiments, the first node profile may be correlated and/or associated with the first financial institution server computer using the first identifier (e.g., bank identification number).

In step 515, the server computer 150 determines that a second financial institution server computer (e.g., distributor node 120A) is authorized to distribute the digital currency. As described above, in some embodiments, the server computer 150 may receive a request from the second financial institution server computer requesting that the second financial institution server computer be designated as a node in the cryptocurrency payment network 145. In such embodiments, the server computer 150 may determine the type of financial institution associated with the second financial institution server computer.

As with the first financial institution, the server computer 150 may determine whether the second financial institution server computer is authorized to generate or distribute the digital currency based on determining a second identifier associated with a second financial institution from the request message from the second financial institution server computer. Where the financial institution is a commercial bank, the financial institution server computer associated with the financial institution may be designated as a distributor node in the cryptocurrency payment network 145, with the rights to distribute digital currency but not to issue or generate digital currency.

In step 520, the server computer 150 generates a second digital certificate for the second financial institution server computer. In some embodiments, the second digital certificate may include a second key (e.g., a node verification public key) that may be used to authenticate the second financial institution server computer as being authorized to distribute the digital currency to a user computing device.

The server computer 150 may also generate a second node profile for the second financial institution server computer in the node profiles database 150c. The server computer 150 may store a key correlated with the second key in the second node profile (e.g., a node verification private key). In some embodiments, the second node profile may be correlated and/or associated with the second financial institution server computer using the first identifier (e.g., bank identification number).

Figure 6:
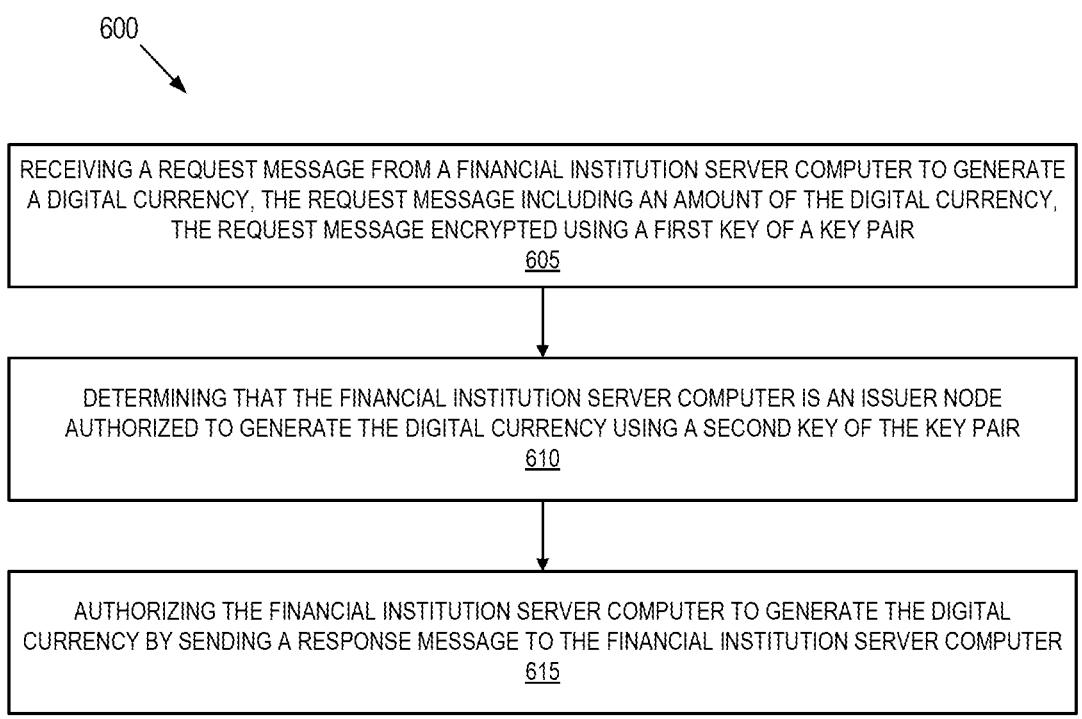
FIG. 6 shows a flowchart of a method for receiving and processing a request for issuance of digital currency in a cryptocurrency payment network according to an embodiment of the present invention.

In step 525, the server computer 150 sends the first digital certificate to the first financial institution server computer and the second digital certificate to the second financial institution server computer. The server computer 150 may second the first digital certificate and the second digital certificate via a communications network 115, or via any other appropriate communications means. In some embodiments, a first non-transitory computer readable medium containing the first digital certificate may be physically provided to the first financial institution server computer, and a second non-transitory computer readable medium containing the second digital certificate may be physically provided to the second financial institution server computer FIG. 6 shows a flowchart of a method 600 for receiving and processing a request for issuance of digital currency in a cryptocurrency payment network 145 according to an embodiment of the present invention.

In step 605, a server computer 150 receives a request message from a financial institution server computer (e.g., issuer node 105A) to generate a digital currency. In some embodiments, the request message may include an amount of the digital currency the financial institution server computer wants to generate. The request message may be encrypted using a first key (e.g., a node verification public key) of a node verification key pair associated with the financial institution server computer. The financial institution server computer may then send the request message to the server computer 150 via the communications network 115 or by any other appropriate communications means.

In step 610, the server computer 150 determines that the financial institution server computer is an issuer node using a second key (e.g., a node verification private key) of the node verification key pair associated with the financial institution server computer. In some embodiments, the server computer 150 may retrieve a node profile associated with the financial institution server computer from the node profiles database 150c. In some embodiments, the management system server computer 150 may retrieve the second key of the node verification key pair from the retrieved profile for the financial institution server computer. The processor and an authentication module 150b-1 may use the retrieved second key to decrypt the request message in order to determine whether the financial institution server computer that sent the request message is an authorized issuer node (e.g., 105A).

In step 615, the server computer 150 authorizes the financial institution server computer to generate the digital currency. The processor 150a and the authentication module 150b-1 in the server computer 150 may generate and send a response message to the financial institution server computer indicating that the financial institution server computer 105A is authorized to generate and issue the digital currency within the cryptocurrency payment network 145.

In some embodiments, the server computer 150 may receive a second request message from a second financial institution server computer (e.g., distributor node 120A). The second request message may indicate that the second financial institution server computer is requesting to distribute digital currency. The request message may be encrypted using a third key (e.g., a second node verification public key) of a second node verification key pair associated with the second financial institution server computer. The second request message may be received by the server computer 150 via the communications network 115 or by any other appropriate communications means. The server computer 150 may determine that the second financial institution server computer is a distributor node using a fourth key (e.g., a second node verification private key) of the node verification key pair associated with the second financial institution server computer. Once the second financial institution server computer has been determined to be an authorized distributor node, the processor 150a and the authentication module 150b-1 in the server computer 150 may generate and send a second response message to the second financial institution server computer indicating that the second financial institution server computer (e.g., 120A) is authorized to distribute digital currency within the cryptocurrency payment network 145.

III. Additional Embodiments

In alternative embodiments, each issuer node (e.g., 105A-105N) in the cryptocurrency payment network 145 may generate their own unique digital currencies once they have been authorized by the management system server computer 150. For example, issuer node 105A may generate digital currency A, issuer node 105B may generated digital currency B, etc. In such embodiments, each issuer node (105A-105N) may be associated with a different central bank or may be associated with a company or any other entity. In such embodiments, an entity such as a merchant could generate and issue its own digital currency that may be used to perform transactions with the merchant and/or with other payment entities associated with the cryptocurrency payment network 145.

In other embodiments, a single issuer node (e.g., 105C) may be able to generate a plurality digital currencies linked to issuer node 105C. In such embodiments, a first digital currency may be linked to a first fiat currency and a second digital currency may be linked to a second fiat currency. In other embodiments, the first digital currency may be linked to a first fiat currency and the second digital currency may not be linked to a fiat currency.

IV. Technical Benefits

Embodiments of the present invention provide a number of advantages and technical benefits. For example, embodiments of the present invention provide the benefit of a cryptocurrency payment network that has increased security from fraud as the participants (e.g., users, merchants) in the cryptocurrency payment network may be known by the financial institutions (e.g., bank) through the establishment of accounts linked to users personal details. As participants in the cryptocurrency payment network have accounts with financial institutions, this allows for better tracking of payment transaction details. This reduces the risk of fraud being perpetrated by anonymous entities within the cryptocurrency payment network, which can be an issue in typical systems, such as Bitcoin.

In addition, in embodiments of the present invention, each of the nodes (e.g., issuer nodes, distributor nodes) must be authenticated and approved by the management system server computer, ensuring that only specific entities (e.g., central banks, government agencies) have the right and ability to issue and generate digital currency for the system. In combination with the ability to link the digital currency to a fiat currency, this provides both enhanced security that the digital currency is valid and prevents value fluctuations of the digital currency.

V. Example Computer Systems

The various participants and elements described herein may operate one or more computer apparatuses to facilitate the functions described herein. Any of the elements in the figures, including any servers or databases, may use any suitable number of subsystems to facilitate the functions described herein.

Figure 7:
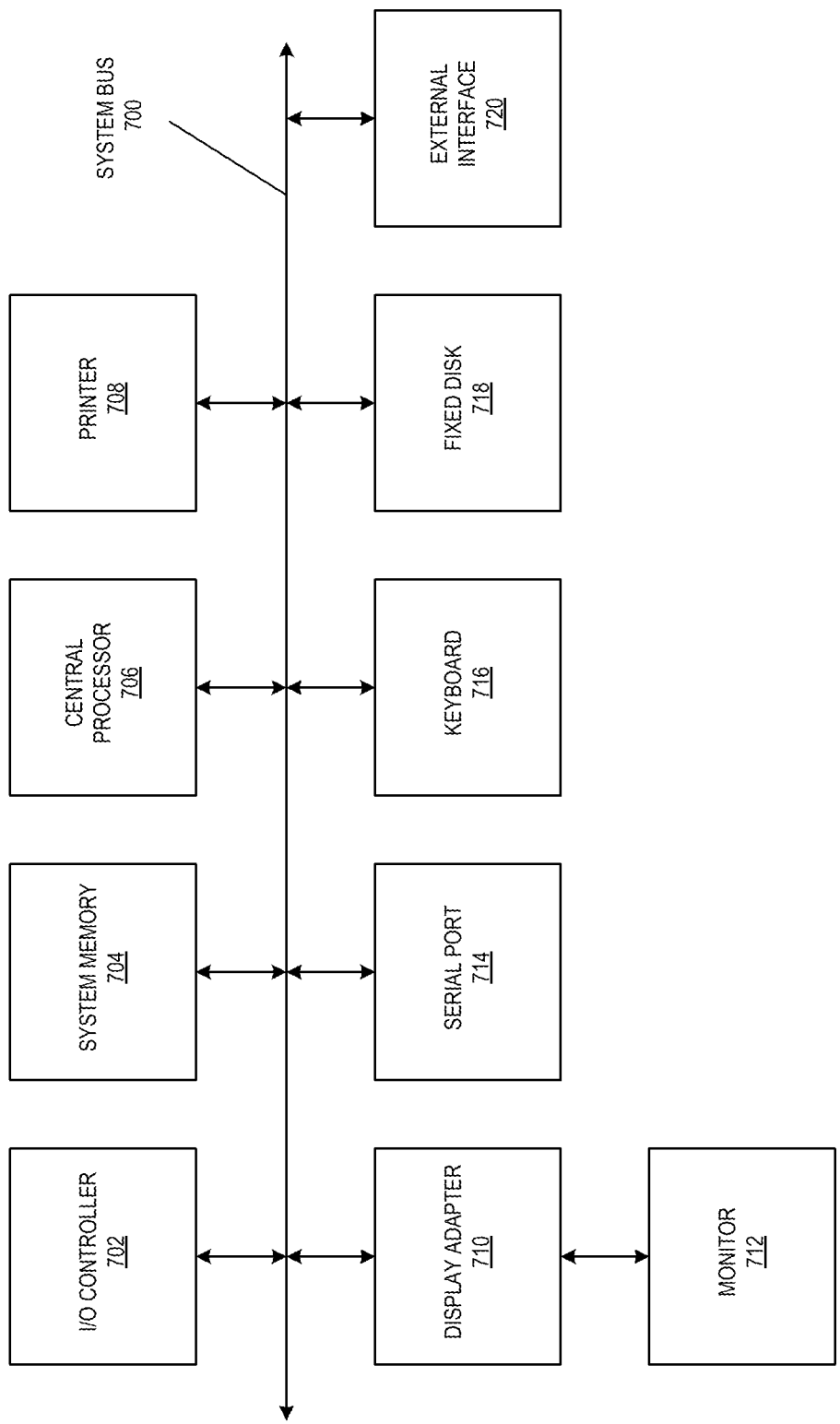
FIG. 7 shows an exemplary block diagram of a computer apparatus according to an embodiment of the present invention.

Examples of such subsystems or components are shown in FIG. 7. Any of the subsystems or components shown in FIG. 7 can be included in any of the previously described devices, apparatuses, or systems. The subsystems shown in FIG. 7 are interconnected via a system bus 700. Additional subsystems such as a printer 708, keyboard 716, fixed disk 718 (or other memory comprising computer readable media), monitor 712, which is coupled to display adapter 710, and others are shown. Peripherals and input/output (I/O) devices, which couple to I/O controller 702 (which can be a processor or other suitable controller), can be connected to the computer system by any number of means known in the art, such as serial port 714. For example, serial port 714 or external interface 720 can be used to connect the computer apparatus to a wide area network such as the Internet, a mouse input device, or a scanner. The interconnection via system bus allows the central processor 706 to communicate with each subsystem and to control the execution of instructions from system memory 704 or the fixed disk 718, as well as the exchange of information between subsystems. The system memory 704 and/or the fixed disk 718 may embody a computer readable medium.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer comprising:
    a processor; and
    a computer readable medium coupled to the processor, the computer readable medium comprising code, executable by the processor, to implement a method comprising:
    receiving, from a management system server computer, a distributor node digital certificate;
    determining, by an authentication module of the server computer, that the received distributor node digital certificate comprises a private key indicating that the server computer is authorized to distribute digital currency;
    generating, by a data output module of the server computer, a first transaction message using the received private key;
    distributing, by the data output module of the server computer to a first payment entity, an amount of digital currency using the generated first transaction message;
    receiving, by the processor, a second transaction message to transfer the amount of the digital currency from the first payment entity to a second payment entity associated with the server computer;
    determining, by the authentication module of the server computer, that the received second transaction message comprises a first identifier for the first payment entity, a second identifier for the second payment entity, the amount of the digital currency, and a digital signature; and
    validating the transfer of the amount of the digital currency using the received digital signature.

2. The server computer of claim 1, wherein validating the transfer of the amount of the digital currency using the digital signature further comprises:
    verifying the digital signature using the second identifier associated with the second payment entity, wherein the second identifier is a public key of the second payment entity.

3. The server computer of claim 1, the method further comprising:
    updating a ledger of transactions in a cryptocurrency payment network stored by the server computer to include information describing the transfer of the amount of the digital currency from the first payment entity to the second payment entity.

4. The server computer of claim 1, the method further comprising:
    sending, to one or more distributor nodes and one or more issuer nodes, the second transaction message indicating the transfer of the amount of the digital currency to the second payment entity,
    wherein each of the one or more distributor nodes and the one or more issuer nodes updates their ledger of transactions to include information describing the transfer of the amount of the digital currency from the first payment entity to the second payment entity.

5. The server computer of claim 4, wherein the second transaction message to the one or more distributor nodes and the one or more issuer nodes includes a first identifier associated with the first payment entity, a second identifier associated with the second payment entity, an amount of the digital currency, and the digital signature.

6. The server computer of claim 1, the method further comprising:
    updating a blockchain ledger of transactions to include information describing the transfer of the amount of the digital currency from the first payment entity to the second payment entity.

7. The server computer of claim 1, the method further comprising:
    receiving a third transaction message indicating that the amount of the digital currency is transferred to the server computer.

8. The server computer of claim 1, wherein
    the first transaction message comprises an address of the server computer, an address of the first payment entity, and the digital signature generated using the private key.

9. The server computer of claim 7, wherein the third transaction message is received responsive to an issuer node computer:
    generating the amount of the digital currency; and
    transferring the digital currency to the server computer by generating the third transaction message indicating that the digital currency is transferred to the server computer, and transmitting, to the server computer the third transaction message.

10. The server computer of claim 9, wherein the amount of the digital currency is generated responsive to a management system server computer:
    receiving a request message to generate the amount of the digital currency, the request message encrypted using a first key indicating that the issuer node computer is authorized to generate digital currency;
    determining that the issuer node computer is authorized to generate digital currency using a second key, the second key associated with the issuer node computer and being part of a key pair comprising the first key and the second key; and
    authorizing the issuer node computer to generate the amount of the digital currency by transmitting a response message to the issuer node computer.

11. The server computer of claim 1, wherein distributing, to the first payment entity, the digital currency comprises:
    transmitting, to a management system server computer, a request message to distribute the digital currency, the request message encrypted using the private key,
    wherein the management system server computer determines that the server computer is authorized to distribute the digital currency using a public key, the public key associated with the server computer and part of a second key pair comprising the private key and the public key, and
    wherein the management system server computer authorizes the server computer to distribute the digital currency by transmitting a response message to the server computer.

12. The server computer of claim 11, wherein the management system server computer determines that the server computer is authorized to generate the digital currency using the public key by:
- retrieving a profile associated with the server computer stored in a database;
- retrieving the public key stored with the retrieved profile; and
- determining that the retrieved public key is associated with the private key of the second key pair received in the request message to distribute the digital currency.

13. The server computer of claim 1, wherein the first identifier is a public key of the first payment entity.

14. The server computer of claim 1, wherein the digital currency is a cryptocurrency.

15. The server computer of claim 1, wherein validating the transfer comprises using a transaction public key of the first payment entity corresponding to a transaction private key of the first payment entity used to create the digital signature to verify the digital signature.

16. The server computer of claim 1, wherein the digital currency is generated according to a value of an associated fiat currency.

\* \* \* \* \*